United States Patent
Grosskopf et al.

(10) Patent No.: US 10,533,654 B2
(45) Date of Patent: Jan. 14, 2020

(54) GENERATOR DRIVE GEAR

(71) Applicant: Hamilton Sundstrand Corporation, Charlotte, NC (US)

(72) Inventors: Andrew P. Grosskopf, Rockford, IL (US); Brady A. Manogue, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 139 days.

(21) Appl. No.: 15/821,364

(22) Filed: Nov. 22, 2017

(65) Prior Publication Data
US 2019/0154134 A1    May 23, 2019

(51) Int. Cl.
| F16H 57/04 | (2010.01) |
| F16H 55/17 | (2006.01) |
| F16C 33/66 | (2006.01) |
| F01D 15/10 | (2006.01) |

(52) U.S. Cl.
CPC ....... *F16H 57/043* (2013.01); *F16C 33/6659* (2013.01); *F16H 55/17* (2013.01); *F16H 57/0471* (2013.01); *F01D 15/10* (2013.01); *F05D 2240/54* (2013.01); *F05D 2260/98* (2013.01); *F16C 2380/27* (2013.01)

(58) Field of Classification Search
CPC .... F16H 55/17; F16H 57/043; F16H 57/0471; F16C 33/6659; F16C 33/6677; F16C 2380/27; F01D 15/10; F05D 2240/54; F05D 2260/98
See application file for complete search history.

(56) References Cited

U.S. PATENT DOCUMENTS

| 3,576,143 | A |   | 4/1971 | Baits |
| 4,252,035 | A | * | 2/1981 | Cordner ................ B64D 41/00 |
|           |   |   |        | 475/72 |
| 4,315,442 | A |   | 2/1982 | Cordner |

FOREIGN PATENT DOCUMENTS

| EP | 3467350 A1 * | 4/2019 | ............. F16H 48/10 |
| JP | 2007292111 A * | 11/2007 | .......... F16C 33/6677 |

OTHER PUBLICATIONS

Extended European search report issued in corresponding EP application No. 18207835.2, dated Aug. 6, 2019.

* cited by examiner

*Primary Examiner* — Thomas C Diaz
(74) *Attorney, Agent, or Firm* — Locke Lord LLP; Daniel J. Fiorello; Scott D. Wofsy

(57) ABSTRACT

A rotor drive generator drive gear for an integrated drive generator can include an annular body having an outer diameter and an inner diameter defining an inner diameter channel through the body in a direction of an axis of rotation of the annular body. The annular body can define a gear defined on the outer diameter of the annular body and a bearing race defined on the outer diameter of the annular body. The bearing race can include a bearing race channel and one or more race relief channels defined from the bearing race channel at least partially inwardly toward the inner diameter channel. One or more lubrication conduits are defined through the body to fluidly connect the inner diameter opening and the bearing race such that lubricant can travel from the inner diameter channel to the bearing race for providing lubrication to a bearing assembly disposed in the bearing race.

7 Claims, 13 Drawing Sheets

GENERATOR DRIVE GEAR

BACKGROUND

1. Field

The present disclosure relates to turbomachine components, more specifically to a generator drive gear (e.g., for a turbomachine integrated drive generator).

2. Description of Related Art

Integrated drive generators (IDG's) require certain gear and bearing mechanics for driving the IDG's at the correct speed and maintaining the rotor operational center. Existing integrated drive systems are generally optimized for specific applications. Such conventional methods and systems have generally been considered satisfactory for their intended purpose. However, there is still a need in the art for improved generator drive gears, for example. The present disclosure provides a solution for this need.

SUMMARY

Embodiments include a generator drive gear means for an integrated drive generator (IDG). In certain embodiments, the generator drive gear means can include a generator shaft attachment means for rotating a generator shaft of the IDG with rotation of the generator drive gear, a bearing race means for providing a roller bearing surface, and a gear means for operatively meshing with a differential assembly gear which is also meshed with an input shaft. The gear means can include gear teeth having dimensions as recited in Table 1 herein.

A rotor drive generator drive gear for an integrated drive generator can include an annular body having an outer diameter and an inner diameter defining an inner diameter channel through the body in a direction of an axis of rotation of the annular body. The annular body can define a gear defined on the outer diameter of the annular body and a bearing race defined on the outer diameter of the annular body. The bearing race can include a bearing race channel and one or more race relief channels defined from the bearing race channel at least partially inwardly toward the inner diameter channel. One or more lubrication conduits are defined through the body to fluidly connect the inner diameter opening and the bearing race such that lubricant can travel from the inner diameter channel to the bearing race for providing lubrication to a bearing assembly disposed in the bearing race.

The one or more lubrication conduits can be defined through the body such that it communicates the inner diameter channel with at least one of the one or more race relief channels. In certain embodiments, the one or more lubrication conduits can be defined at an angle of about 45 degrees between the inner diameter channel and the one or more race relief channels.

One or more lubrication conduits can be angled such that a forward race relief opening of the one or more lubrication conduits are axially closer to the gear than an aft inner diameter opening of the one or more lubrication conduits. One or more lubrication conduits can be angled such that an aft race relief opening of the one or more lubrication conduits are axially further from the gear than a forward inner diameter opening of the one or more lubrication conduits.

In certain embodiments, the one or more lubrication conduits includes a plurality of lubrication conduits. The one or more race relief channels can include a forward race relief channel and an aft race relief channel such that the forward race relief channel is closer to the gear than the aft race relief channel.

At least one of the plurality of lubrication conduits can include a forward race relief opening defined in communication with the forward race relief channel, and at least one of the plurality of lubrication conduits can include an aft race relief opening defined in communication with the aft race relief channel. In certain embodiments, each lubrication conduit that includes a forward race relief opening includes an aft inner diameter opening that is axially further from the gear than the forward race relief opening of that lubrication conduit.

Additionally or alternatively, in certain embodiments, each lubrication conduit that includes an aft race relief opening includes a forward inner diameter opening that is axially closer to the gear than the aft race relief opening of that lubrication conduit. In certain embodiments, the lubrication conduits alternate circumferentially between those with a forward race relief opening and an aft race relief opening.

The gear can include gear teeth having dimensions as recited in Table 1 herein. Any other suitable dimensions are contemplated herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
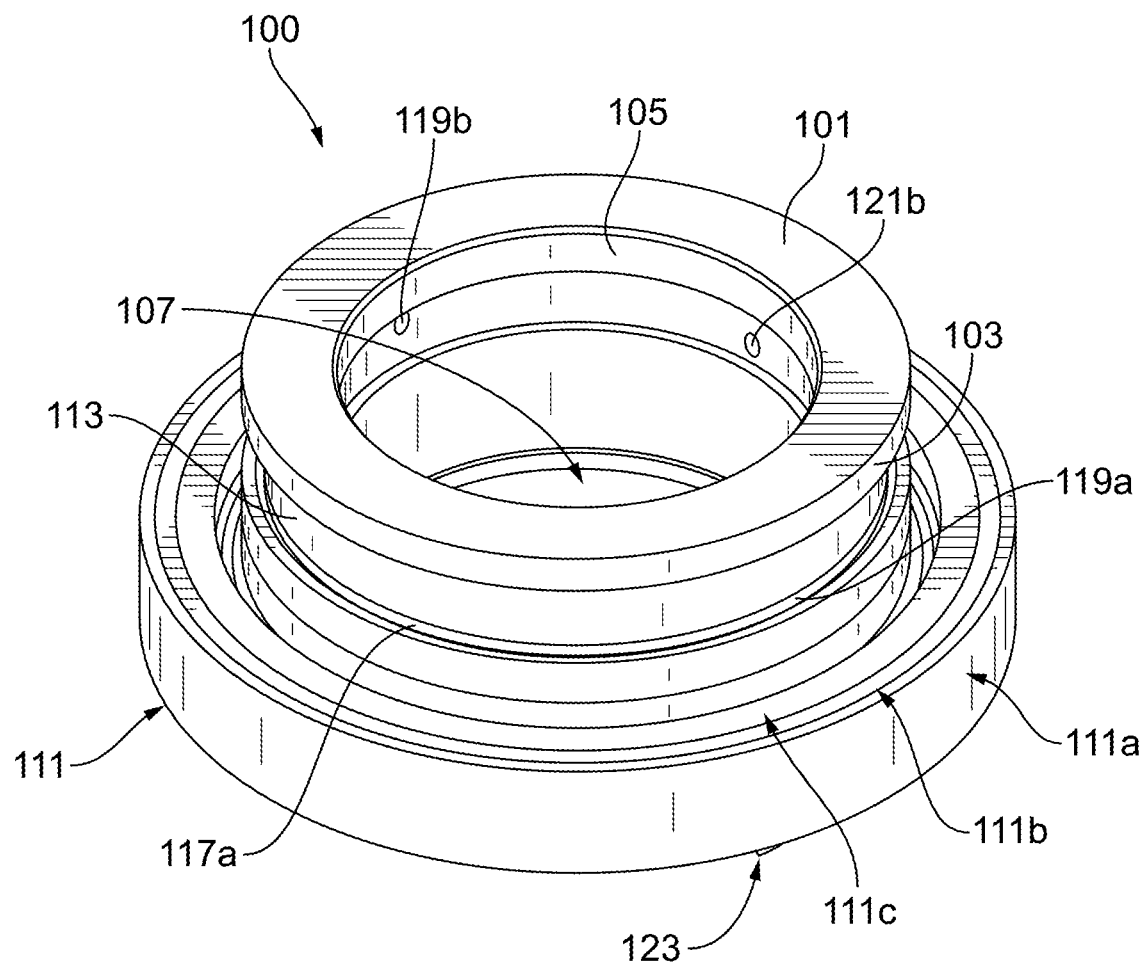
FIG. 1 is a perspective view of an embodiment of a generator drive gear in accordance with this disclosure.
Figure 2:
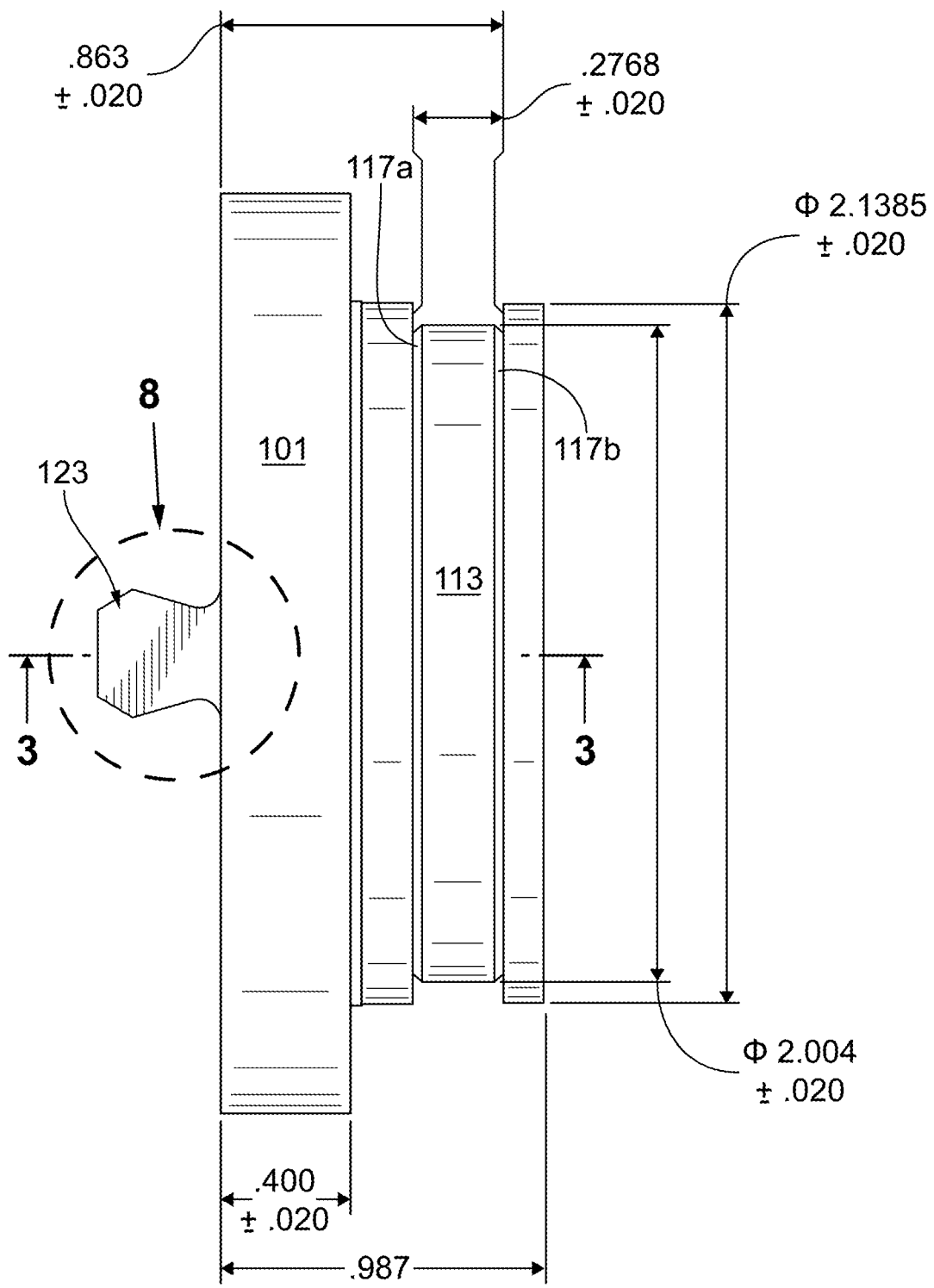
FIG. 2 is an elevation view of the embodiment of FIG. 1.

Reference will now be made to the drawings wherein like reference numerals identify similar structural features or aspects of the subject disclosure. For purposes of explanation and illustration, and not limitation, an illustrative view of an embodiment of a generator drive gear in accordance with the disclosure is shown in FIG. 1 and is designated generally by reference character 100. Other embodiments and/or aspects of this disclosure are shown in FIGS. 2-14.

Referring generally to FIGS. 1-14, various views of an embodiment of a generator drive gear are shown. While certain drawings include dimensions, it is understood by those having ordinary skill in the art that these dimensions are representative of certain embodiments (e.g., for the E2 Integrated Drive Generator (IDG) made by United Technologies of Rockford, Ill.) and are non-limiting. Any shown or stated dimensions can be changed and/or scaled in any suitable manner, and can be exact or can include any suitable predetermined range within the stated value.

Referring to FIGS. 1-9, a rotor drive generator drive gear 100 for an integrated drive generator (e.g., as shown in FIGS. 11-14) can include an annular body 101 having an outer diameter 103 and an inner diameter 105 defining an inner diameter channel 107 through the body 101 in a direction of an axis of rotation 109 of the annular body 101. The annular body 101 can include any suitable shape, e.g., axially non-uniform as shown, for any suitable purpose.

The annular body 101 can include a gear 111 defined on the outer diameter 103 of the annular body 101. As used herein, the term "defined on" includes, but is not limited to "integrally formed with", "attached to", "defined within", and/or any other suitable definition as appreciated by those having ordinary skill in the art.

A bearing race 113 can be defined on the outer diameter 103 of the annular body. Referring to FIGS. 2-7, the bearing race 113 can include a bearing race channel 115 and one or more race relief channels 117a, 117b defined from the bearing race channel 115 at least partially inwardly toward the inner diameter channel 107. One or more lubrication conduits 119, 121 are defined through the body 101 to fluidly connect the inner diameter opening 107 and the bearing race 113 such that lubricant can travel from the inner diameter channel 107 to the bearing race 113 for providing lubrication to a bearing assembly (e.g., as shown in FIGS. 11-14) disposed in the bearing race 113.

In certain embodiments, as shown, the one or more lubrication conduits 119, 121 can be defined through the body 101 to communicate the inner diameter channel 107 with at least one of the one or more race relief channels 117a, 117b. In certain embodiments, the one or more lubrication conduits 119, 121 can be defined at an angle of about 45 degrees between the inner diameter channel 107 and the one or more race relief channels 117a, 117b. Any other suitable angle is contemplated herein.

One or more lubrication conduits 119 can be forward angled such that a forward race relief opening 119a of the one or more lubrication conduits 119 are axially closer to the gear 111 than an aft inner diameter opening 119a of the one or more lubrication conduits 119. In certain embodiments, one or more lubrication conduits 121 can be aft angled such that an aft race relief opening 121a of the one or more lubrication conduits 121 are axially further from the gear 111 than a forward inner diameter opening 121b of the one or more lubrication conduits 121.

In certain embodiments, the one or more lubrication 119, 121 conduits can include a plurality of lubrication conduits 119, 121 as shown. The one or more race relief channels 117a, 117b can include a forward race relief channel 117a and an aft race relief channel 117b such that the forward race relief channel 117a is closer to the gear 111 than the aft race relief channel 117b.

Figure 3:
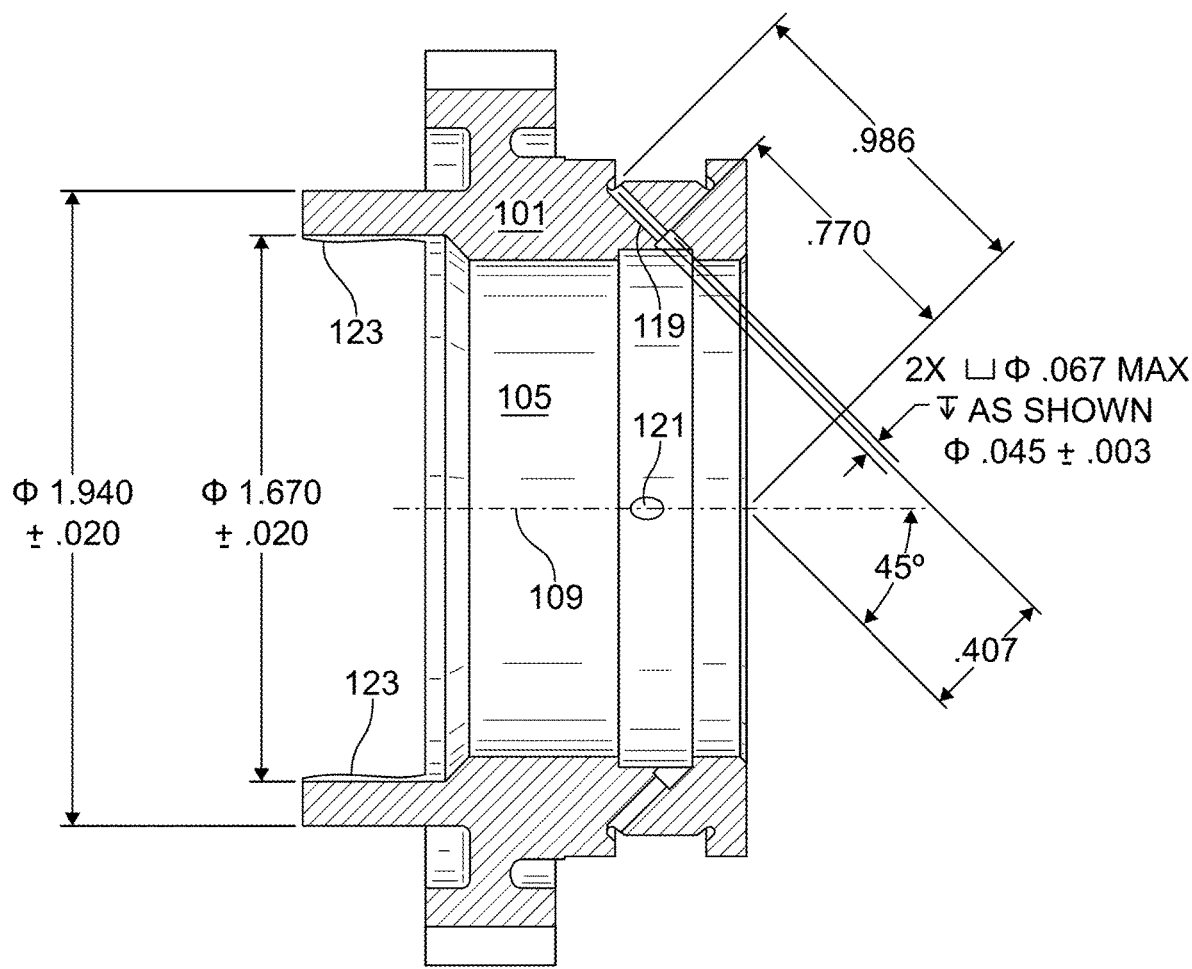
FIG. 3 is a cross-sectional view of the embodiment of FIG. 1.
Figure 4:
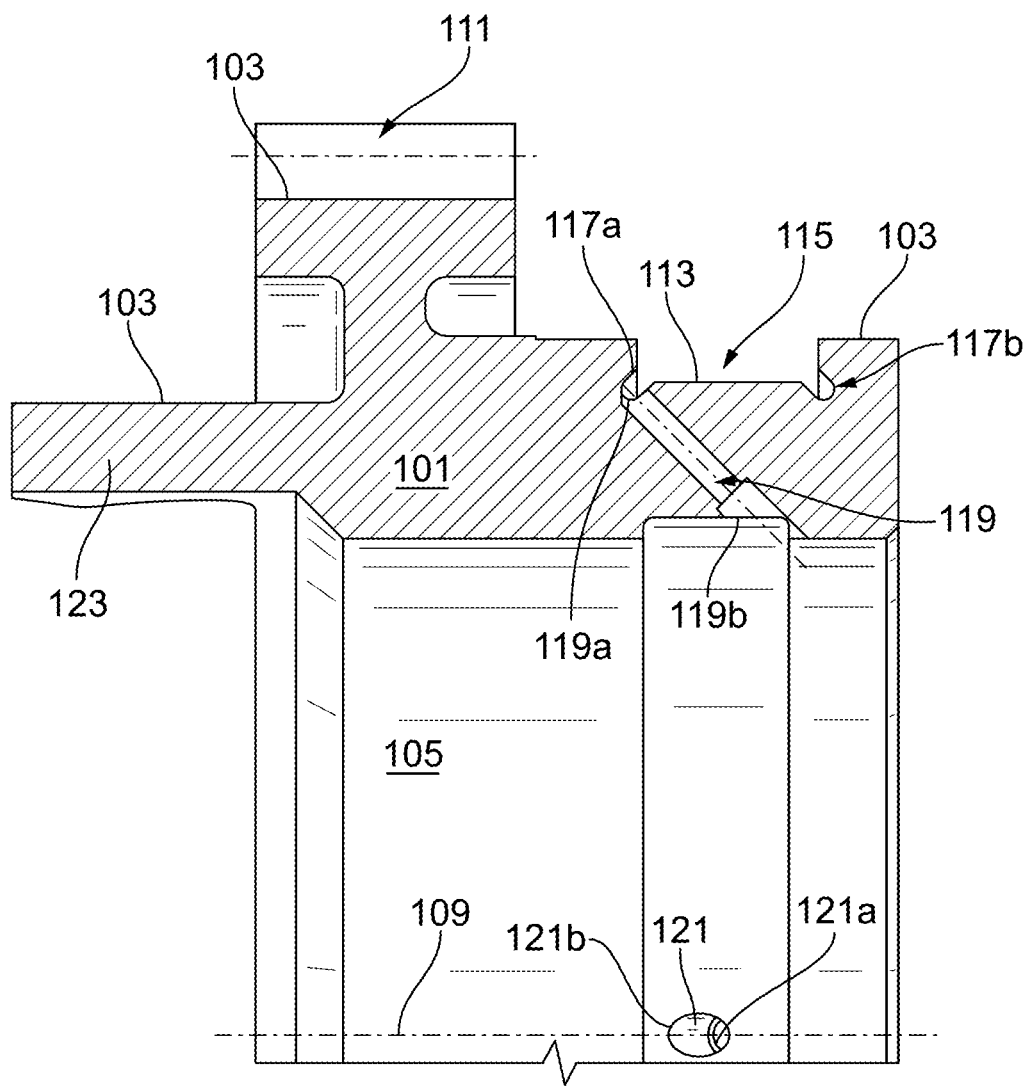
FIG. 4 is a zoomed view of a portion of the embodiment of FIG. 3.
Figure 5:
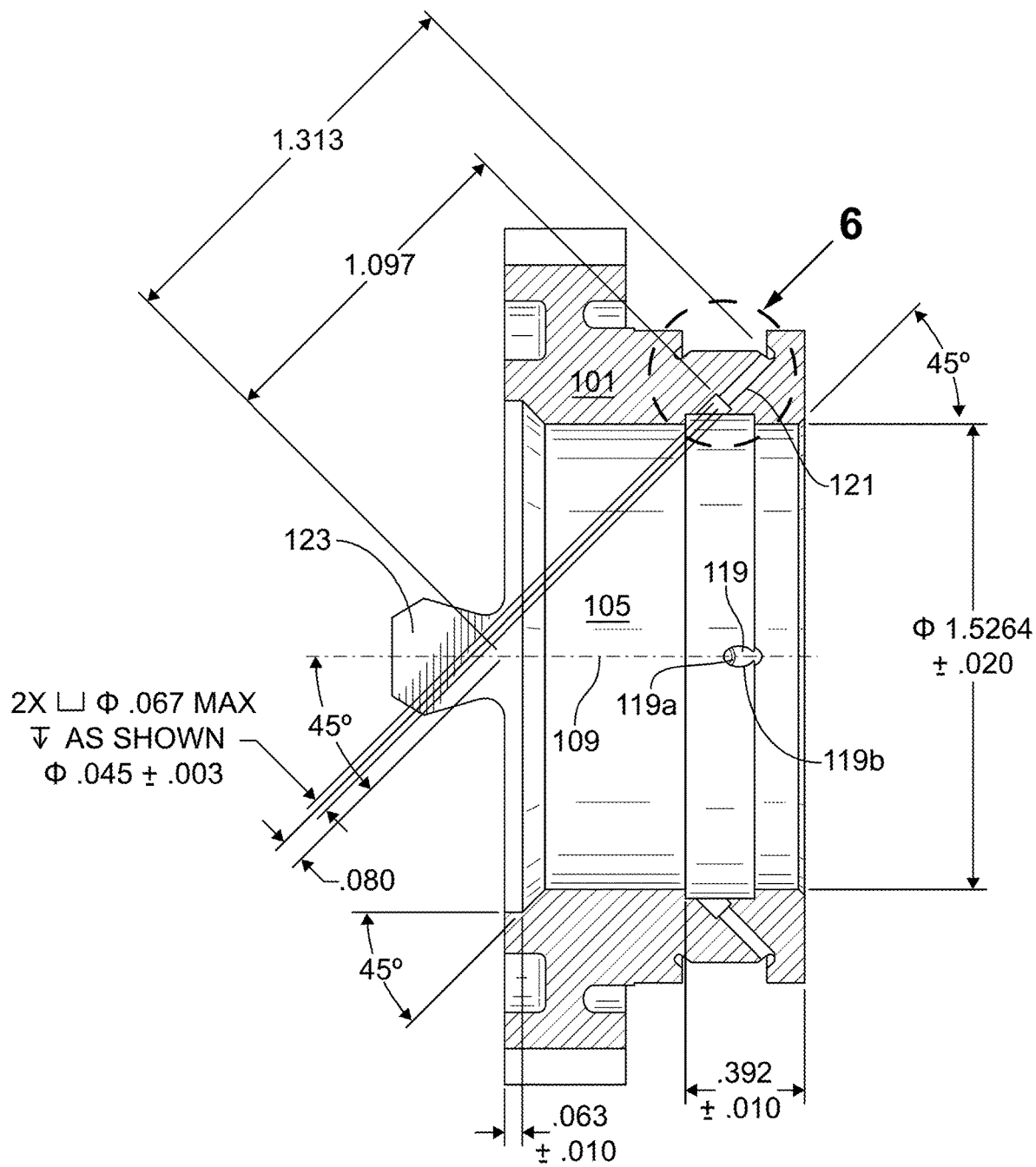
FIG. 5 is a cross-sectional view of the embodiment of FIG. 1.
Figure 6:
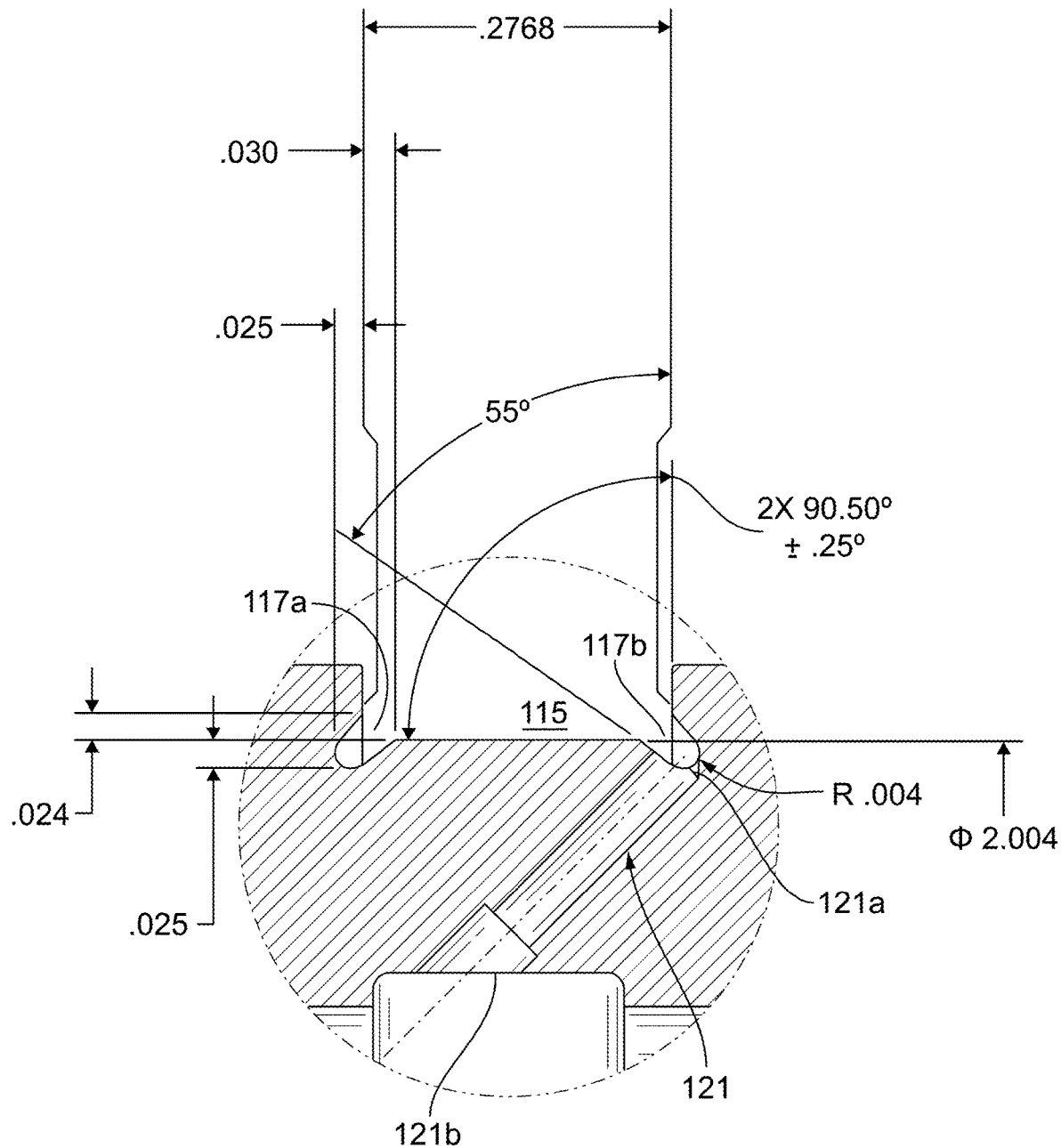
FIG. 6 is a zoomed view of a portion of the embodiment of FIG. 5.
Figure 7:
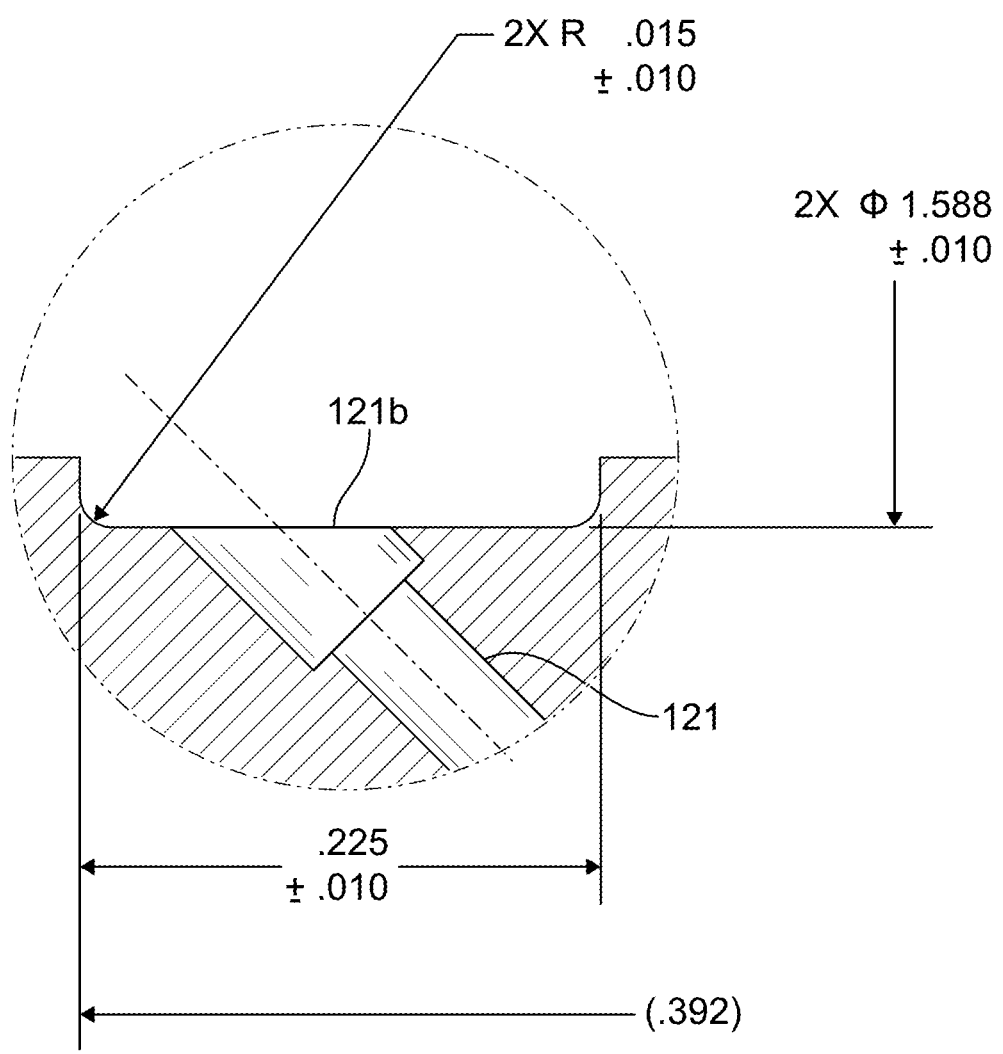
FIG. 7 is a zoomed view of a portion of the embodiment of FIG. 5.
Figure 8:
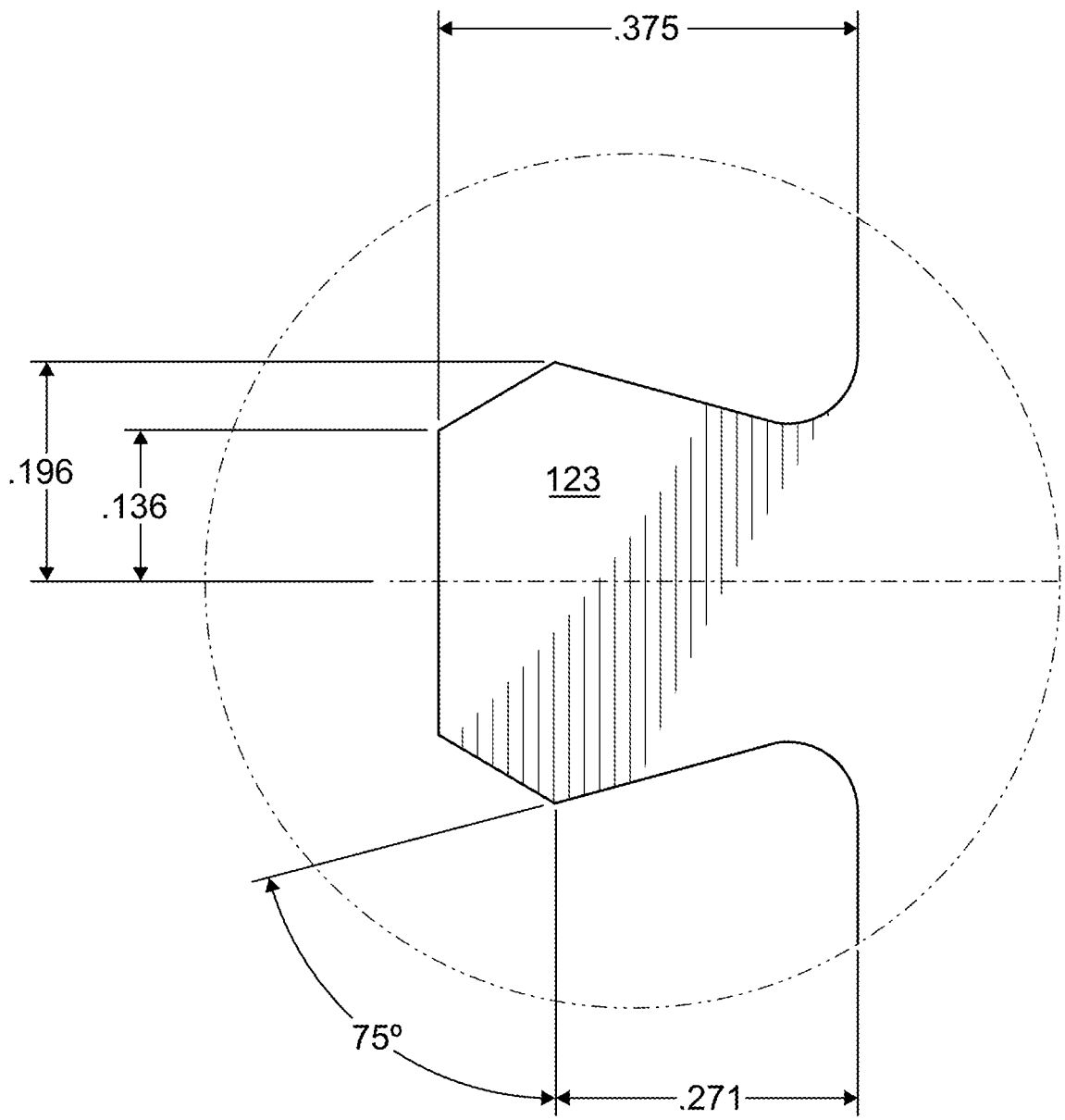
FIG. 8 shows a zoomed view of an embodiment of a tab in accordance with this disclosure.
Figure 9:
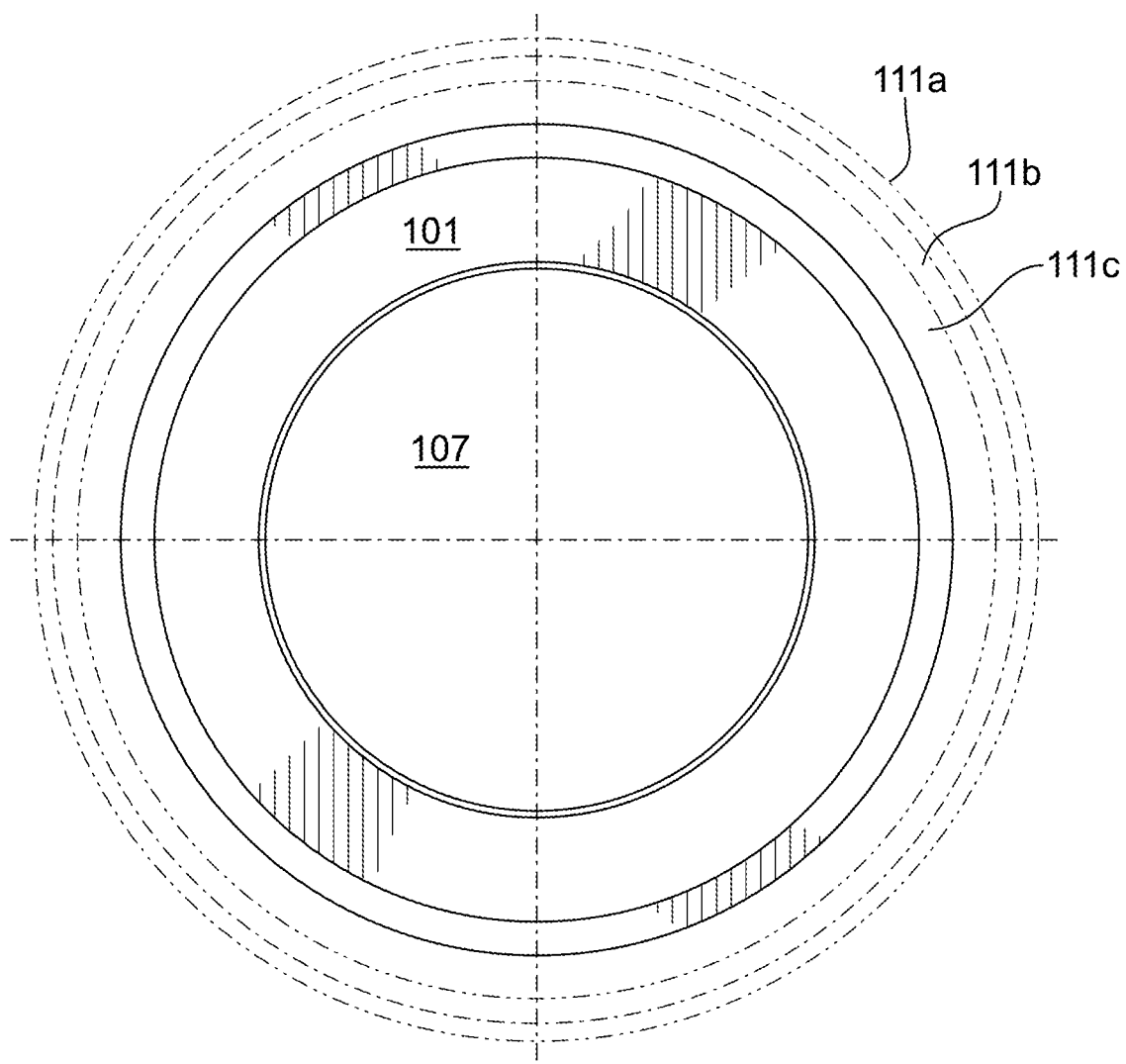
FIG. 9 shows a plan view of the embodiment of FIG. 1.

In certain embodiments, as shown, at least one of the plurality of lubrication conduits 119 can include a forward race relief opening 119a defined in communication with the forward race relief channel 117a (e.g., as shown in FIGS. 3-4), and at least one of the plurality of lubrication conduits 121 can include an aft race relief opening 121a defined in communication with the aft race relief channel 117b (e.g., as shown in FIGS. 5-7). In certain embodiments, each lubrication conduit 119 that includes a forward race relief opening 119a includes an aft inner diameter opening 119b that is axially further from the gear 111 than the forward race relief opening 119a of that lubrication conduit 119 (e.g., as shown in FIGS. 3-4). Any other configuration for the openings 119a, 119b relative to each other is contemplated herein.

Additionally or alternatively, in certain embodiments, each lubrication conduit 121 that includes an aft race relief opening 121a can include a forward inner diameter opening 121b that is axially closer to the gear 111 than the aft race relief opening 121a of that lubrication conduit 121 (e.g., as shown in FIGS. 5-7). In certain embodiments, the lubrication conduits alternate circumferentially between those with a forward race relief opening and an aft race relief opening. Any other configuration for the openings 121a, 121b relative to each other is contemplated herein.

Lubrication conduits 119, 121 can be formed in the body 101 in any suitable manner (e.g., drilling, additive manufacturing, etc.).

Figure 13:
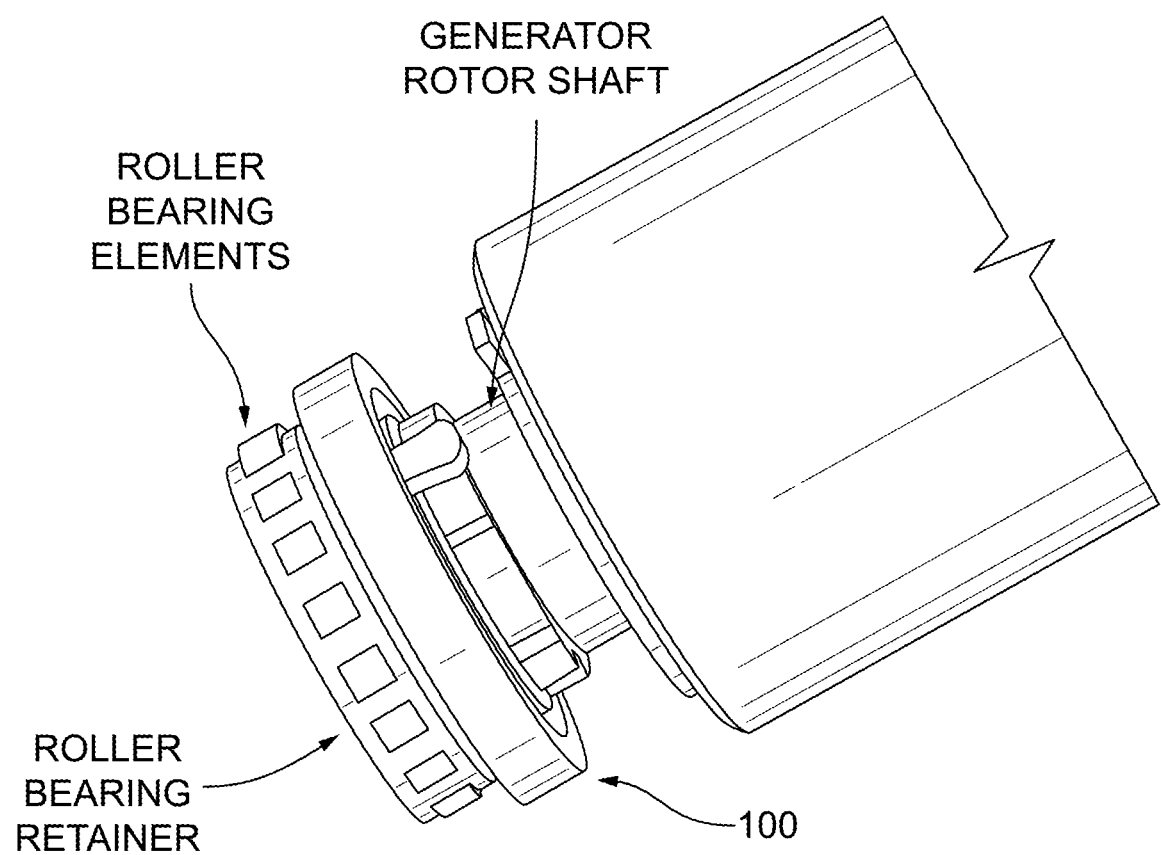
FIG. 13 is a perspective view of the embodiment of FIG. 12.
Figure 14:
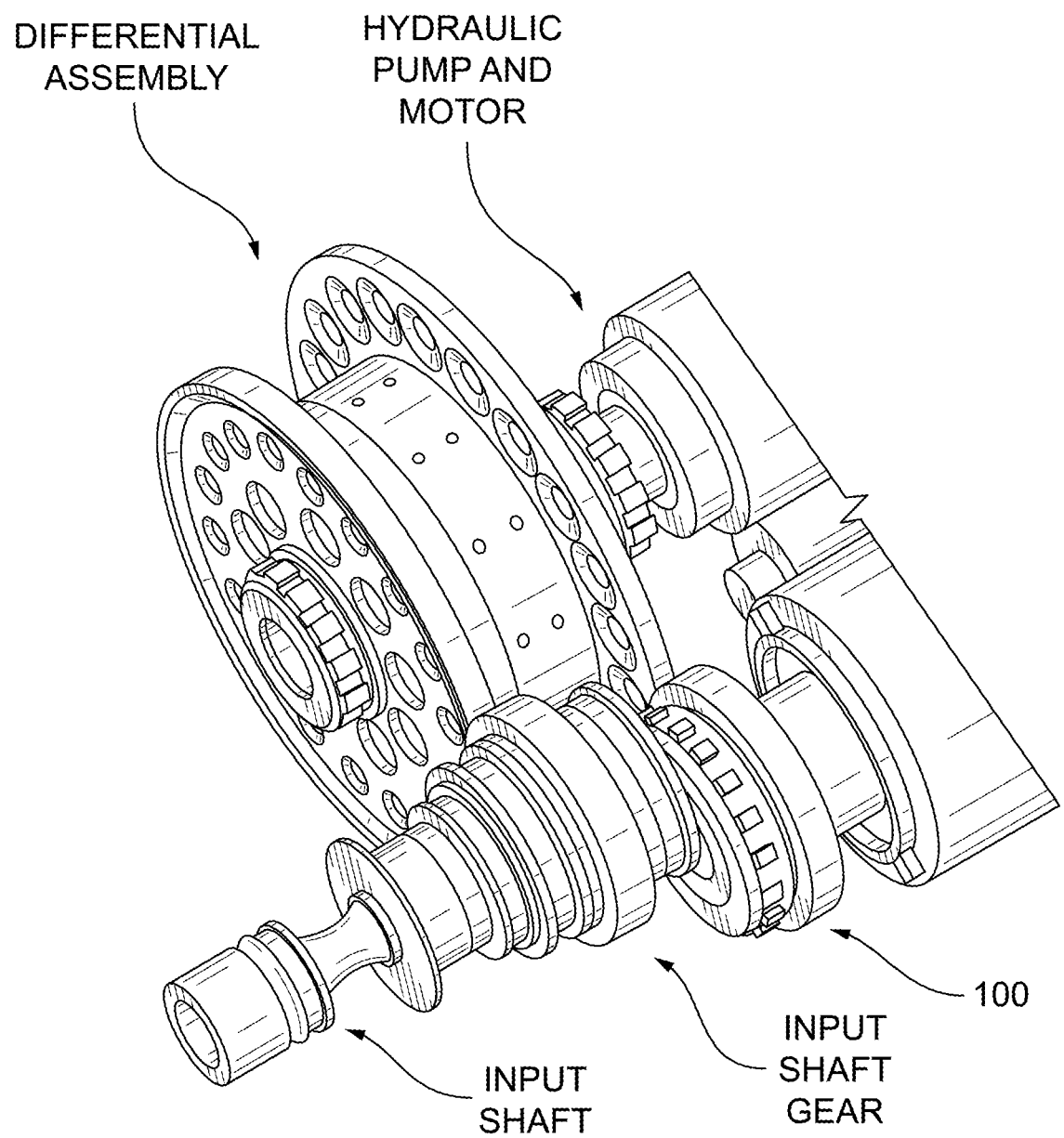
FIG. 14 shows an embodiment of a generator system disposed in relating to an input shaft and a differential in accordance with this disclosure.

Referring to FIGS. 2-4 and 8, the body 101 can define one or more tabs 123 (e.g., two tabs 123 as shown in FIG. 3) extending therefrom axially. One or more tabs 123 can include any suitable size and shape, and can be configured to connect to a generator shaft (e.g., as shown in FIGS. 13-14). The one or more tabs 123 can act as the positive drive feature which drives the generator shaft.

Figure 10:
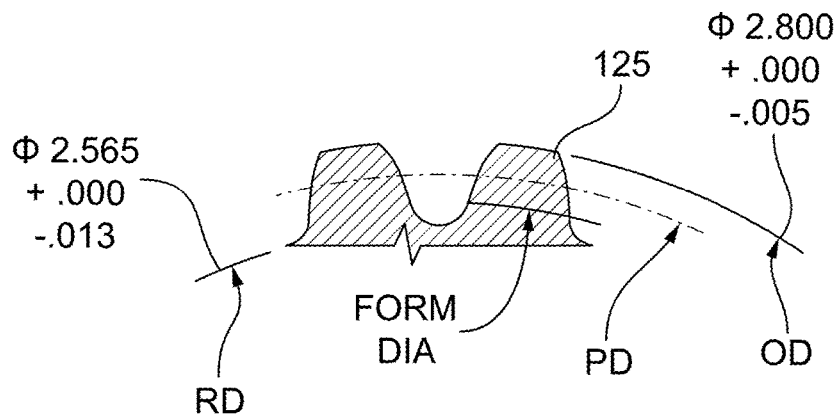
FIG. 10 shows a schematic cross-sectional diagram of an embodiment of gear teeth in accordance with this disclosure.
Figure 11:
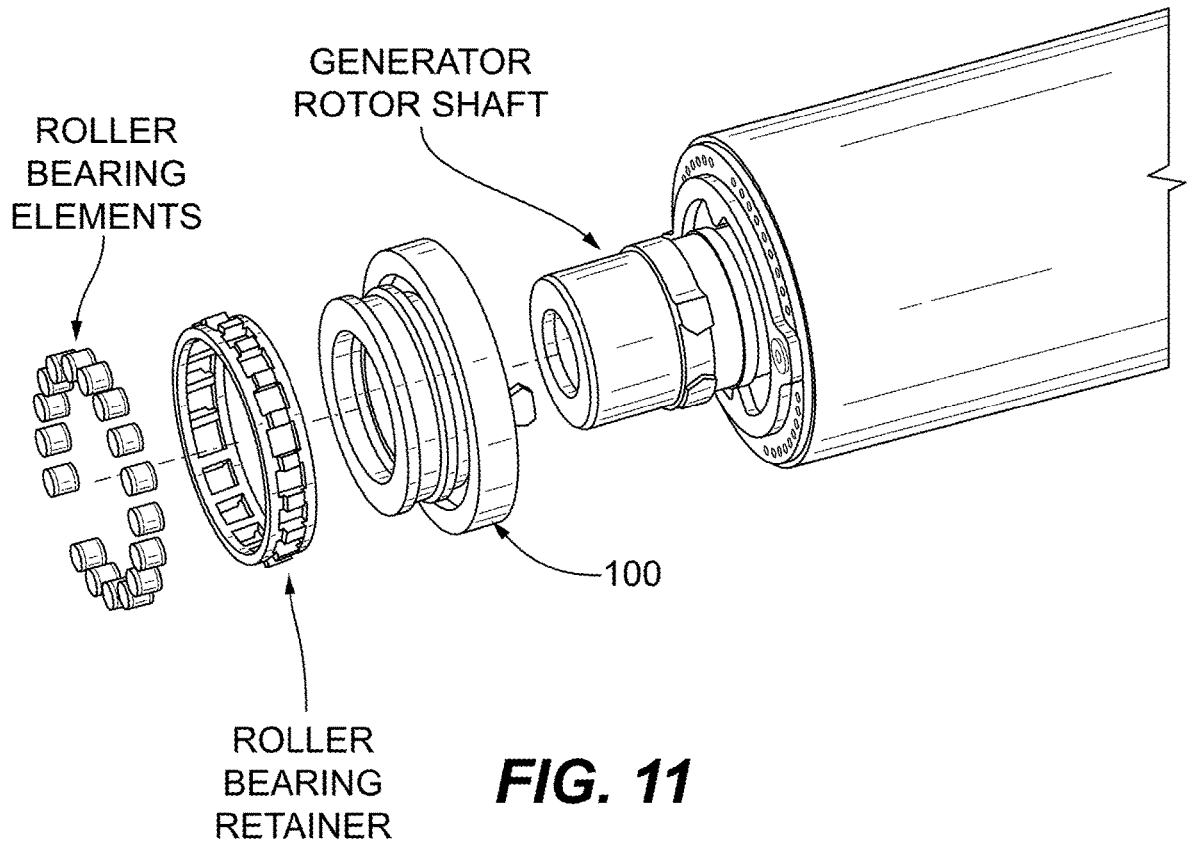
FIG. 11 shows an exploded view of an embodiment of a generator assembly in accordance with this disclosure.
Figure 12:
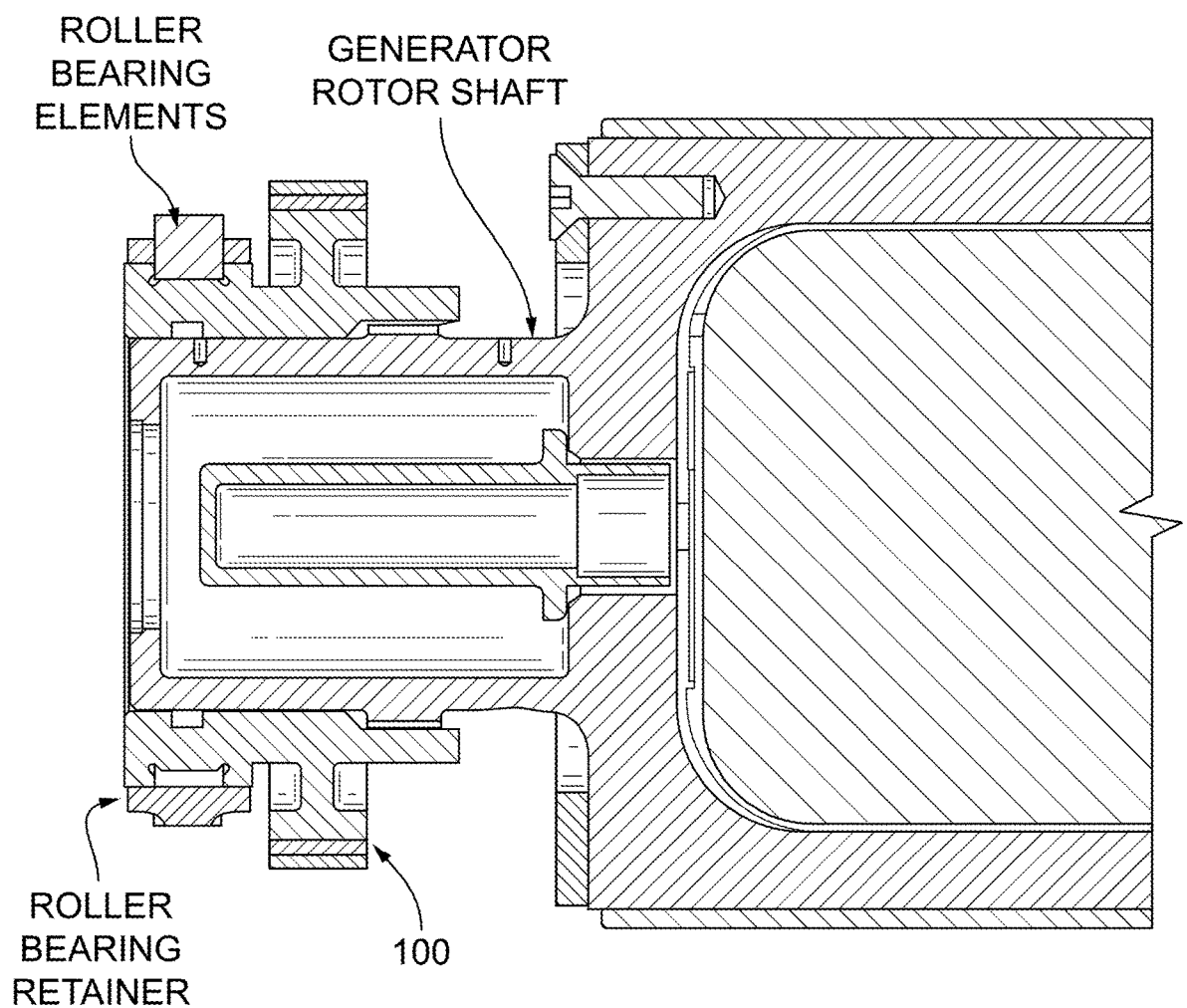
FIG. 12 is a cross-sectional view of the embodiment of FIG. 11.

FIG. 1 shows the gear 111 schematically, where rings show diameters of the gear 111. For example this outer ring 111a is the major diameter of the gear teeth, middle ring 111b is pitch diameter of the gear teeth, and inner ring 111c is the minor diameter of gear teeth. Referring additionally to FIGS. 10-12, the gear 111 can include gear teeth 125 having dimensions as recited in Table 1 hereinbelow. Any other suitable dimensions are contemplated herein.

As shown in FIG. 10 "OD" is the outer diameter of the gear teeth 125, or the major diameter. "PD" is the pitch diameter, "RD" is the root diameter, and "FORM DIA" is the form diameter or minor diameter. Any suitable shape for the gear teeth is contemplated herein.

The below disclosed gear tooth characteristics in Table 1 may be used for the E2 Integrated Drive Generator (IDG) made by United Technologies Corporation of Rockford, Ill. Embodiments such as that shown in Table 1 can allow for speed trimming and control. Any suitable number of gear teeth is contemplated herein.

TABLE 1

| GEAR DATA | |
|---|---|
| TYPE | SPUR |
| NO OF TEETH | 54 |
| NORMAL DIAMETRAL PITCH-STD | (20) |
| PITCH DIAMETER (PD) | (2.7000) |
| NORM PRESSURE ANGLE-STD | (25°) |
| CENTER DISTANCE | (4.5750) |
| NO OF TEETH IN MATING GEAR(S) | (129) |
| ROLL ANGLE AT A | 20.51° |
| ROLL ANGLE AT B | 22.68° |
| ROLL ANGLE AT C | 29.20° |
| ROLL ANGLE AT D | 31.37° |
| POINT D DIAMETER | (2.78979) |
| ROOT DIAMETER (RD) | 2.565 ± 0.02 |
| OUTER DIAMETER (OD) | 2.800 ± 0.01 |

Units disclosed in Table 1 and in the drawings are in inches, but may be scaled in any suitable manner and be converted to any other suitable unit (e.g., metric units). Those having ordinary skill in the art that the any values disclosed herein can be exact values or can be values within a predetermined range. In certain embodiments, a predetermined range can be ±10%, or ±5%, or ±2%, or ± any other suitable number as appreciated by those having ordinary skill in the art (e.g., for known tolerance limits or error ranges).

Embodiments include a generator drive gear means as disclosed hereinabove for an integrated drive generator (IDG). As described, in certain embodiments, the generator drive gear means can include a generator shaft attachment means (e.g., the tab) for rotating a generator shaft of the IDG with rotation of the generator drive gear, a bearing race means (e.g., integrally defined) for providing a roller bearing surface, and a gear means for operatively meshing with a differential assembly gear which is also meshed with an input shaft. The gear means can include gear teeth having dimensions as recited in Table 1 above (exact or within any suitable range), or any other suitable dimensions.

Referring to FIGS. 11-14, an embodiment of the generator drive gear 100 is shown disposed on a generator and in a system showing the functional connections thereof.

The integral generator roller bearing race and gear can be used for driving the IDG rotor at the correct speed and maintain the rotor operational center. Embodiments of the bearing race and gear as disclosed herein can be sized (e.g., as shown) to improve IDG bearing life and maintain correct speeds for a given block diagram.

Any suitable combination(s) of any disclosed embodiments and/or any suitable portion(s) thereof is contemplated therein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A generator drive gear for an integrated drive generator, comprising:

an annular body having an outer diameter and an inner diameter defining an inner diameter channel through the body in a direction of an axis of rotation of the annular body, wherein the annular body defines:

a gear defined on the outer diameter of the annular body; and a bearing race defined on the outer diameter of the annular body, wherein the bearing race includes a bearing race channel and one or more race relief channels defined from the bearing race channel at least partially inwardly toward the inner diameter channel, wherein one or more lubrication conduits are defined through the body to fluidly connect the inner diameter opening and the bearing race such that lubricant can travel from the inner diameter channel to the bearing race for providing lubrication to a bearing assembly disposed in the bearing race, wherein the one or more lubrication conduits are defined through the body such that it communicates the inner diameter channel with at least one of the one or more race relief channels, wherein the one or more lubrication conduits includes a plurality of lubrication conduits, wherein the one or more race relief channels include a forward race relief channel and an aft race relief channel, wherein the forward race relief channel is closer to the gear than the aft race relief channel, wherein at least one of the plurality of lubrication conduits include a forward race relief opening defined in communication with the forward race relief channel, and at least one of the plurality of lubrication conduits include an aft race relief opening defined in communication with the aft race relief channel; and wherein each lubrication conduit that includes a forward race relief opening includes an aft inner diameter opening that is axially further from the gear than the forward race relief opening of that lubrication conduit.

2. The generator drive gear of claim 1, wherein the one or more lubrication conduits are defined at an angle of about 45 degrees between the inner diameter channel and the one or more race relief channels.

3. The generator drive gear of claim 1, wherein one or more lubrication conduits are angled such that said forward race relief opening of the one or more lubrication conduits are axially closer to the gear than said aft inner diameter opening of the one or more lubrication conduits.

4. The generator drive gear of claim 1, wherein the one or more lubrication conduits are angled such that an aft race relief opening of the one or more lubrication conduits are axially further from the gear than a forward inner diameter opening of the one or more lubrication conduits.

5. A generator drive gear for an integrated drive generator, comprising:

an annular body having an outer diameter and an inner diameter defining an inner diameter channel through the body in a direction of an axis of rotation of the annular body, wherein the annular body defines:

a gear defined on the outer diameter of the annular body; and a bearing race defined on the outer diameter of the annular body, wherein the bearing race includes a bearing race channel and one or more race relief channels defined from the bearing race channel at least partially inwardly toward the inner diameter channel, wherein one or more lubrication conduits are defined through the body to fluidly connect the inner diameter opening and the bearing race such that lubricant can travel from the inner diameter channel to the bearing race for providing lubrication to a bearing assembly disposed in the bearing race, wherein the one or more lubrication conduits are defined through the body such that it communicates the inner diameter channel with at least one of the one or more race relief channels, wherein the one or more lubrication conduits includes a plurality of lubrication conduits, wherein the one or more race relief channels include a forward race relief channel and an aft race relief channel, wherein the forward race relief channel is closer to the gear than the aft race relief channel, wherein at least one of the plurality of lubrication conduits include a forward race relief opening defined in communication with the forward race relief channel, and at least one of the plurality of lubrication conduits include an aft race relief opening defined in communication with the aft race relief channel; and wherein each lubrication conduit that includes an aft race relief opening includes a forward inner diameter opening that is axially closer to the gear than the aft race relief opening of that lubrication conduit.

6. The generator drive gear of claim 5, wherein each lubrication conduit that includes a forward race relief opening includes an aft inner diameter opening that is axially further from the gear than the forward race relief opening of that lubrication conduit.

7. The generator drive gear of claim 6, wherein the lubrication conduits alternate circumferentially between those with a forward race relief opening and an aft race relief opening.

* * * * *